(12) United States Patent
Asai

(10) Patent No.: US 8,443,164 B2
(45) Date of Patent: May 14, 2013

(54) DATA MANAGEMENT DEVICE AND DATA MANAGEMENT METHOD

(75) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/219,451

(22) Filed: Aug. 26, 2011

(65) Prior Publication Data

US 2012/0054461 A1    Mar. 1, 2012

(30) Foreign Application Priority Data

Aug. 27, 2010    (JP) ................................. 2010-190317

(51) Int. Cl.
*G06F 12/00*    (2006.01)
(52) U.S. Cl.
USPC ......................................................... 711/170
(58) Field of Classification Search ........................ None
See application file for complete search history.

(56) References Cited

U.S. PATENT DOCUMENTS

| | | | |
|---|---|---|---|
| 2008/0021971 A1* | 1/2008 | Halgas | 709/207 |
| 2008/0312909 A1* | 12/2008 | Hermansen et al. | 704/9 |
| 2010/0293204 A1* | 11/2010 | Baker et al. | 707/812 |
| 2010/0293205 A1* | 11/2010 | Baker et al. | 707/812 |

FOREIGN PATENT DOCUMENTS

| | | |
|---|---|---|
| JP | H08-161239 A | 6/1996 |
| JP | 2003-209794 A | 7/2003 |
| JP | 2005-038327 A | 2/2005 |
| JP | 2005-117487 A | 4/2005 |

OTHER PUBLICATIONS

Japan Patent Office, Notice of Reasons for Rejection for Japanese Patent Application No. 2010-190317 (counterpart Japanese patent application). mailed Jan. 22, 2013.

* cited by examiner

*Primary Examiner* — Hiep Nguyen
(74) *Attorney, Agent, or Firm* — Baker Botts L.L.P.

(57) ABSTRACT

A data management device includes a memory configured to save data and a processor. The processor is configured to save acquired data into the memory when the save command is received. The processor is further configured to execute a process which processes the data acquired by the acquisition unit when the specific command is received. The process is different from saving the data into the memory. The processor is still further configured to generate a first data name in accordance with a first rule and attach the first data name to the acquired data. Moreover, the processor is configured to generate a second data name in accordance with a second rule different from the first rule and attach the second data name to the acquired data.

15 Claims, 6 Drawing Sheets

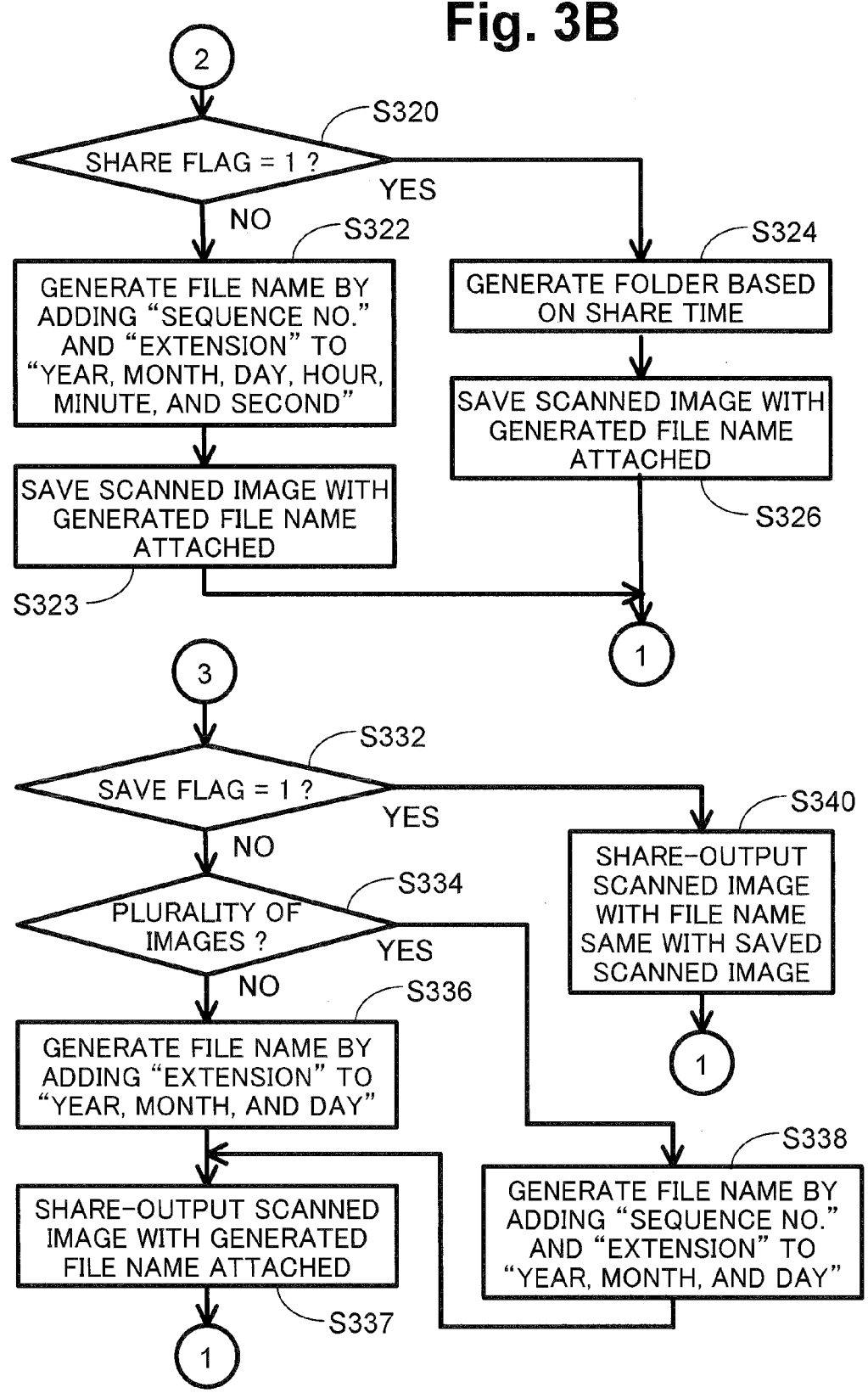

DATA MANAGEMENT DEVICE AND DATA MANAGEMENT METHOD

CROSS REFERENCE TO RELATED APPLICATION

The present application claims priority from Japanese Patent Application No. 2010-190317, filed on Aug. 27, 2010, the disclosure of which is incorporated herein by reference in its entirely.

BACKGROUND

1. Technical Field

The present invention relates to a data management device and data management method.

2. Related Art

A digital still camera that changes a file naming method in accordance with a file system of a removable storage medium is known. However, the known device uniformly generates a data name.

SUMMARY

A need has arisen to provide a data management device and a data management method which generates a data name in accordance with an intended use.

According to an embodiment of the present invention, a data management device comprises a memory configured to save data, a command receiving unit configured to receive a save command and a particular command different from the save command, an acquisition unit that acquires data, and a processor. The processor is configured to save the data acquired by the acquisition unit into the memory when the save command is received by the command receiving unit. The processor is further configured to execute a process which processes the data acquired by the acquisition unit when the specific command is received by the command receiving unit. The process is different from saving the data into the memory. The processor is still further configured to generate a first data name in accordance with a first rule and attach the first data name to the acquired data to be saved in the memory. Moreover, the processor is configured to generate a second data name in accordance with a second rule different from the first rule and attach the second data name to the acquired data to which the process is to be executed.

According to an embodiment of the present invention, a computer-readable medium bearing instructions for controlling a data management device including a memory configured to save data and a command receiving unit configured to receive a save command and a particular command different from the save command, the instructions, when executed, being arranged to cause a processor to perform steps. The steps comprise acquiring data, and saving the acquired data in the memory when the save command is received by the command receiving unit. The steps further comprise executing a process which processes the acquired data when the specific command is received by the command receiving unit. The process is different from saving the data into the memory. The steps further comprise generating a first data name in accordance with a first rule and attaching the first data name to the acquired data to be saved in the memory. Moreover, the steps further comprise generating a second data name in accordance with a second rule different from the first rule and attaching the second data name to the acquired data to which the process is to be executed.

According to an embodiment of the present invention, a data management method for a data management device including a memory configured to save data, a command receiving unit configured to receive a save command and a particular command different from the save command, is provided. The data management method comprises steps of acquiring data and receiving a save command and a particular command different from the save command. The data management method further comprises a step of saving the data acquired in the acquiring step into the memory when the save command is received in the receiving step. The data management method still further comprises a step of executing a process which processes the data acquired in the acquiring step when the specific command is received in the receiving step. The process is different from saving the data into the memory. Moreover, the data management method comprises a step of generating a first data name in accordance with a first rule and attaching the first data name to the acquired data to be saved in the memory. The data management method further comprises a step of generating a second data name in accordance with a second rule different from the first rule and attaching the second data name to the acquired data to which the process is to be executed.

BRIEF DESCRIPTION OF THE DRAWINGS

For a more complete understanding of the present invention, the needs satisfied thereby, and the features and advantages thereof, reference now is made to the following descriptions taken in connection with the accompanying drawings wherein:

FIGS. 3A and 3B show a flowchart of a scanning process executed in a first embodiment of a mobile telephone.

DESCRIPTION OF PREFERRED EMBODIMENTS

Figure 1:
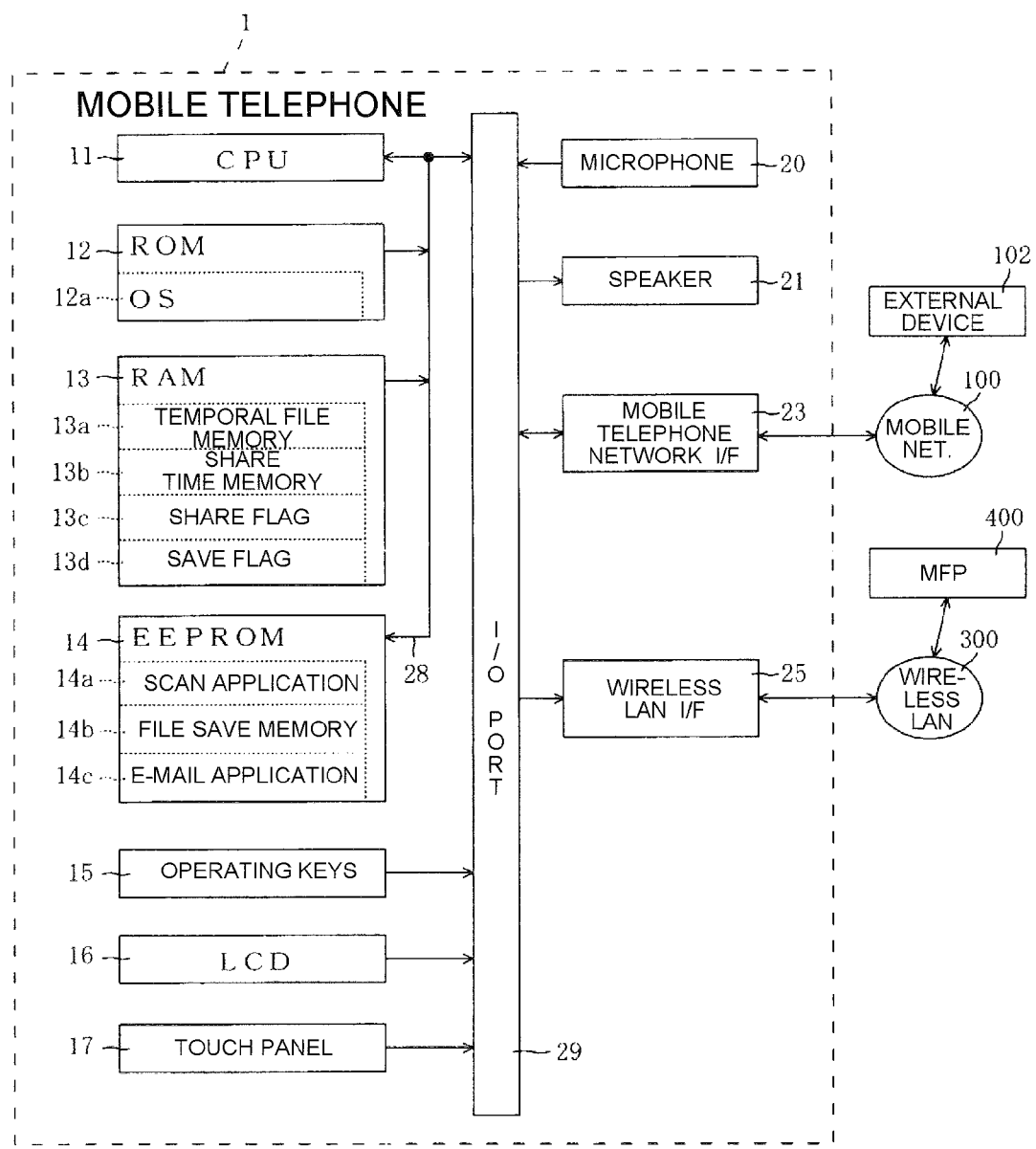
FIG. 1 shows a block diagram of an electrical configuration of a mobile telephone in which a scan application is installed.

Embodiments of the invention and their features and advantages may be understood by referring to FIGS. 1-4A and 4B, like numerals being used for like corresponding parts in the various drawings. Referring now to the drawings as needed, embodiments of the invention will be described. Needless to say, the embodiments described below are examples in which the invention is embodied, and the embodiments may be modified as needed without changing the scope of the invention.

FIG. 1 is a block diagram schematically showing an electrical configuration of a mobile telephone 1, in which a scan application 14a is installed, which is a first embodiment of the invention. The mobile telephone 1 is configured such that the mobile telephone can generate and attach a file name in accordance with an intended use to a scanned image acquired from a multifunction machine 400 such as multifunction peripheral (MFP).

The mobile telephone 1 mainly includes a CPU 11, a ROM 12, a RAM 13, an EEPROM 14, operating keys 15, an LCD 16, a touch panel 17, a microphone 20, a speaker 21, a mobile telephone network connection interface 23 (hereafter, a mobile telephone network connection I/F 23), and a wireless LAN connection interface 25 (hereafter, a wireless LAN connection I/F 25).

The CPU 11, ROM 12, RAM 13, and EEPROM 14 are connected to each other via a bus line 28. Also, the operating key 15, LCD 16, touch panel 17, microphone 20, speaker 21, mobile telephone network connection I/F 23, wireless LAN connection I/F 25, and bus line 28 are connected to each other via an input/output port 29.

The CPU 11 is a processing unit that controls functions included in the mobile telephone 1, and portions connected to the input/output port 29, in accordance with various kinds of fixed value or program stored in the ROM 12 or RAM 13, or with various kinds of signal transmitted and received via the mobile telephone net connection I/F 23 and wireless LAN connection I/F 25.

The ROM 12 is a non-rewritable, non-volatile memory that stores an operating system 12*a* (hereafter, an OS 12*a*), fixed values, and the like. In the embodiment, the OS 12*a* is Android (registered trademark), and is a program for carrying out a basic control of hardware of the mobile telephone 1, and for executing a process such as a transfer of data between applications.

The RAM 13 is a rewritable, volatile memory that temporarily stores various kinds of data when various operations of the mobile telephone 1 are executed, and a temporary file memory 13*a*, a share time memory 13*b*, a share flag 13*c*, and a save flag 13*d* are assigned therein. The multifunction machine 400 generates a JPEG format scanned image (an example of data) by reading an original with a scanner. The mobile telephone 1 acquires the scanned image from the multifunction machine 400 by executing the scan application 14*a*, and stores the acquired scanned image in the temporary file memory 13*a* as a temporary file.

When a "share output command", to be described hereafter, is input for a scanned image stored in the temporary file memory 13*a*, the share time memory 13*b* acquires the current time (including year, month, day, hour, minute, and second) from a base station (not shown), and stores the year, month, day, hour, and minute included in the current time as a share time.

The share flag 13*c* and save flag 13*d* are initialized to "0" when a scanned image is acquired from the multifunction machine 400. The share flag 13*c* is set to "1" when the scanned image acquired from the multifunction machine 400 is share output to an application other than the scan application 14*a*. Meanwhile, the save flag 13*d* is set to "1" when the scanned image acquired from the multifunction machine 400 is saved in a file save memory 14*b*.

The EEPROM 14 is a rewritable, non-volatile memory, and the scan application 14*a* and file save memory 14*b* are assigned therein. The CPU 11 executes a process of acquiring a scanned image from the multifunction machine 400 in accordance with the scan application 14*a*, details of which will be described hereafter with reference to FIGS. 3A and 3B. Also, when a "save command" is input for the scanned image acquired from the multifunction machine 400, the CPU 11 stores the scanned image acquired from the multifunction machine 400 in the file save memory 14*b*. It is assumed that an application other than the scan application 14*a*, such as an electronic mail application 14*c*, is also stored in the EEPROM 14.

A key for selecting a button displayed on the screen, a power key for carrying out a turning on and off of the power of the mobile telephone 1, and the like, are provided in the operating keys 15. The LCD 16 displays the status of an operating procedure or a process being executed, an image selected by a user, and the like. Also, the touch panel 17, which is a kind of input device, is provided on the display surface of the LCD 16. When the user touches either of buttons 32*a* and 32*b* (FIGS. 2A to 2C) displayed on the LCD 16, the position thereof is detected by the touch panel 17, and a command corresponding to the button 32*a* or 32*b* touched by the user is input into the CPU 11.

The microphone 20 and speaker 21 are for carrying out a telephone call with an external device 102 connected via the mobile telephone network 100. The mobile telephone 1 carries out a verbal telephone call or packet communication with the external device 102 via the mobile telephone network connection OF 23. As the mobile telephone network connection I/F 23, it is possible to use one that connects with the mobile telephone network using, for example, a wideband code division multiple access (W-CDMA) method or a code division multiple access (CDMA) 2000 method.

The wireless LAN connection I/F 25 connects the mobile telephone 1 and a wireless LAN network 300 using wireless communication complying with the standards of IEEE 802.11. The mobile telephone 1 acquires various kinds of data, such as a scanned image, from the multifunction machine 400 via the wireless LAN network 300 connected via the wireless LAN connection I/F 25.

Figure 2C:
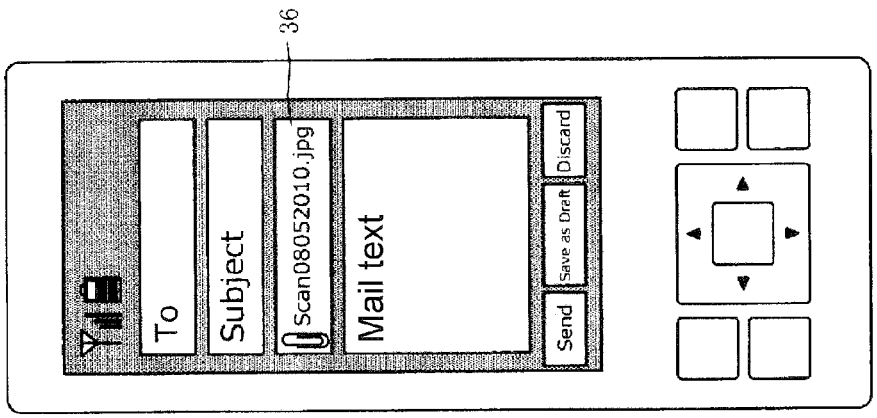
FIGS. 2A to 2C show diagrams illustrating operation screens displayed on an LCD of a mobile telephone.
Figure 2B:
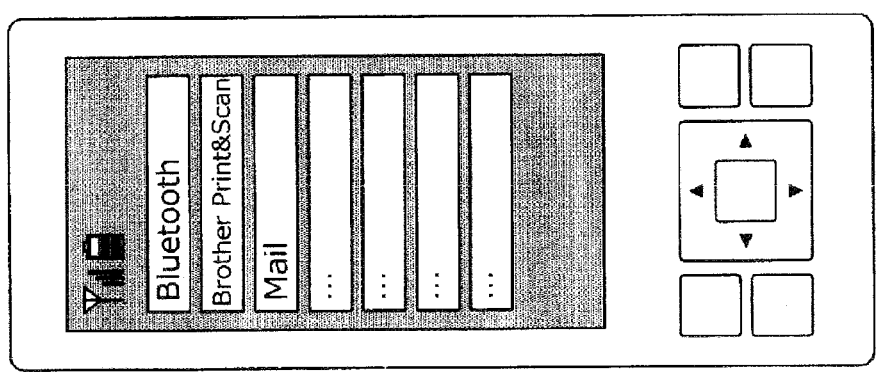
Figure 2A:
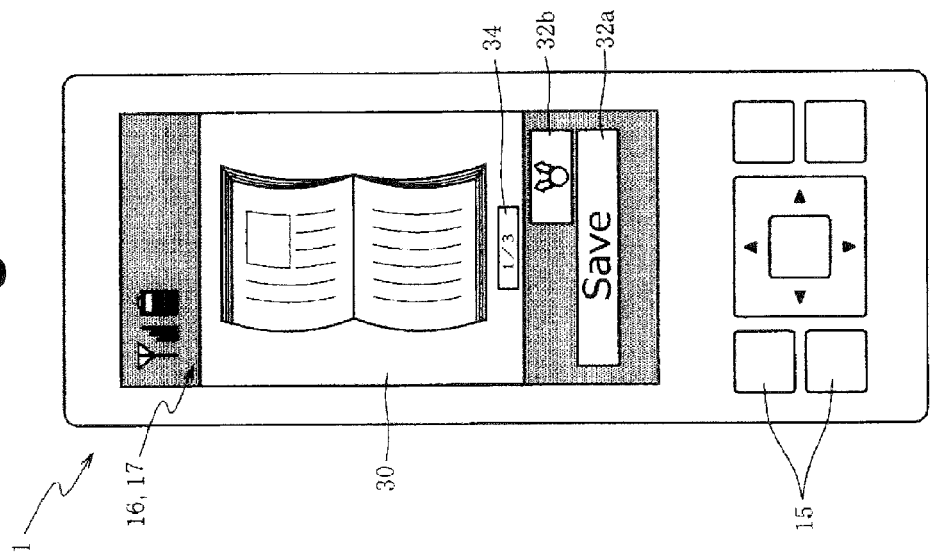

FIGS. 2A to 2C are diagrams illustrating operation screens displayed on the LCD 16 of the mobile telephone 1. FIG. 2A is an example of a scanned image browsing screen displayed on the LCD 16 when the user activates the scan application 14*a*. As shown in FIG. 2A, a scanned image 30 acquired by the mobile telephone 1 from the multifunction machine 400 is displayed on the scanned image browsing screen. Also, the save button 32*a* for inputting a "save command", and the share output button 32*b* for inputting a "share output command", are displayed on the scanned image browsing screen. As the touch panel 17 is provided on the display surface of the LCD 16, the user can input a "save command" by touching the save button 32*a* or a "share output command" by touching the share output button 32*b*. Also, it is also possible to input the command by selecting one of the buttons 32*a* and 32*b* by operating the operating keys 15. As described above, the LCD 16 and the touch panel 17 of the mobile telephone 1 can receive a "save command" and a "share output command" and therefore operates as a command receiving unit.

When a "save command" is received, the CPU 11 attaches a file name to the scanned image acquired from the multifunction machine 400, and saves the scanned image in the file save memory 14*b*. Meanwhile, when a "share output command" is received, the CPU 11 attaches a file name to the scanned image acquired from the multifunction machine 400, and outputs the scanned image to an application other than the scan application 14*a*.

When the user carries out an operation of sliding a finger from the right side toward the left side of the touch panel 17 over the scanned image browsing screen, the mobile telephone 1 switches the scanned image displayed on the LCD 16 to one with a newer generation date and time. Conversely, when the user carries out an operation of sliding a finger from the left side toward the right side of the touch panel 17, the mobile telephone 1 switches the scanned image displayed on the LCD 16 to one with an older generation date and time. That is, when a plurality of scanned images are acquired from the multifunction machine 400, one scanned image selected by the user is displayed on the scanned image browsing screen.

As shown in FIG. 2A, a page number 34 wherein a total number of scanned images acquired by the mobile telephone 1 from the multifunction machine 400 is shown as a denominator, and wherein a generation order of the currently displayed scanned image amongst all the scanned images is shown as a numerator, may be displayed on the scanned image browsing screen.

FIG. 2B is a diagram illustrating an example of an output destination selection screen displayed on the LCD 16 when a "share output command" is received. Herein, a "share output" in the embodiment means a process of transferring (outputting) data being processed in one application to another application, and this transferring of data is carried out via the OS 12*a*.

When a "share output command" is input, the OS 12*a* retrieves applications that can handle the data which are the subject of the share output (in the case of the embodiment, applications that can handle JPEG format data) from the EEPROM 14 as share output destination application candidates. Then, the OS 12*a* displays a list of the retrieved candidates as an output destination selection screen on the LCD 16, as shown in FIG. 2B. The user can select an application to which the scanned image is to be transferred from amongst the applications displayed in the list, and specifies the application using the touch panel 17 or operating keys 15. Meanwhile, the OS 12*a* activates the application selected by the user, and transfers the scanned image received from the scan application 14*a*.

FIG. 2C is a diagram showing an example of a mail making screen displayed on the LCD 16 when the electronic mail application 14*c* is selected by the user as a share output destination application. As shown in FIG. 2C, the file name (for example, Scan08052010.jpg) of a scanned image transferred from the OS 12*a* (that is, a scanned image that has been share output) is specified in an attached file section 36 of the mail making screen. Herein, in the embodiment, the file name of the scanned image is decided by the scan application 14*a*. Hereafter, a description will be given of the details.

Figure 3A:
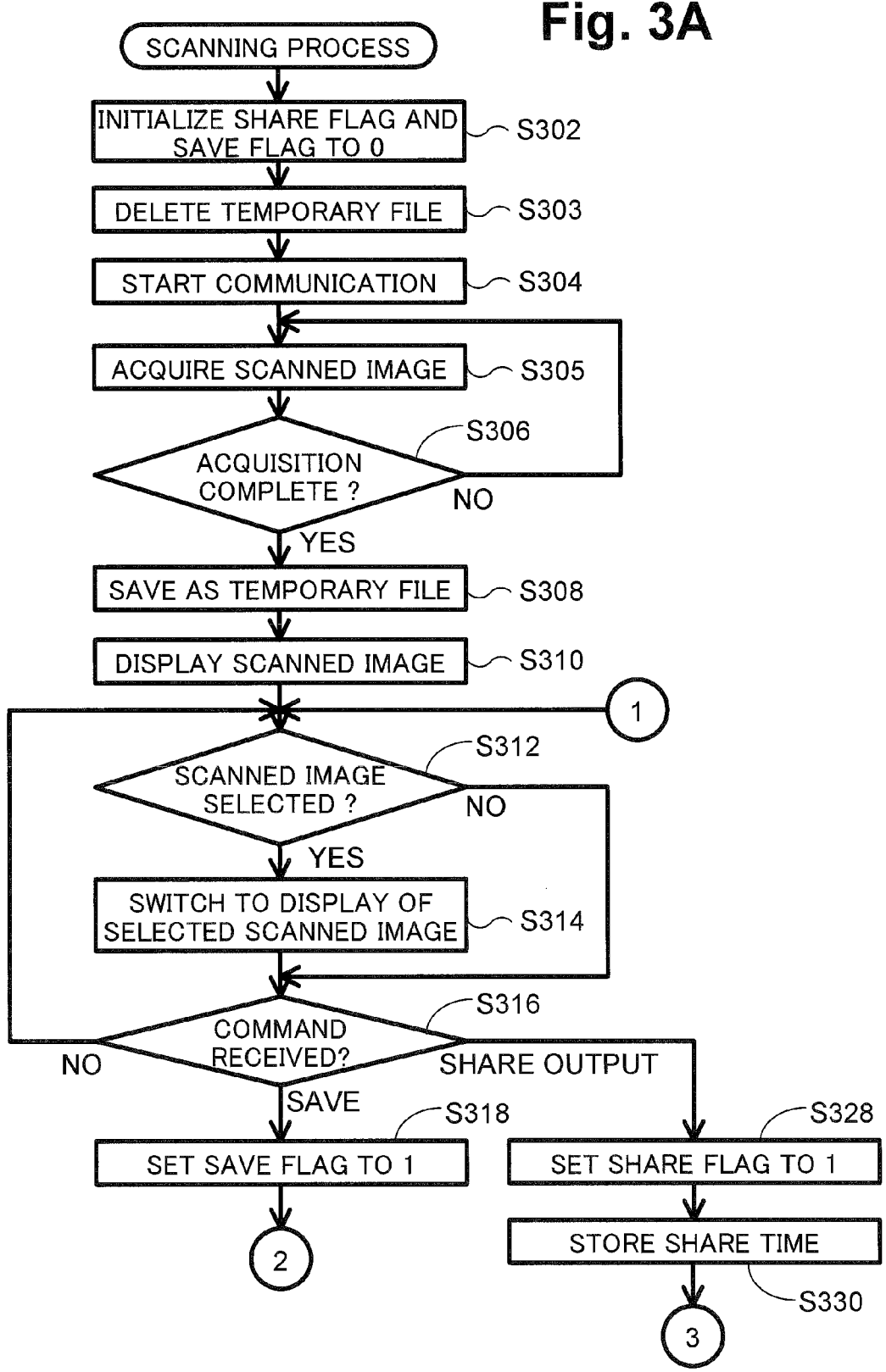

FIGS. 3A and 3B shows a flowchart of a scanning process executed by the CPU 11 of the mobile telephone 1 of the first embodiment. In the scanning process, a scanned image is acquired from the multifunction machine 400, a file name in accordance with an intended use is attached to the acquired scanned image, and the image is saved or share output. The process is started when the user activates the scan application 14*a*.

Firstly, in step S302 (hereafter, "step" will be omitted), the CPU 11 initializes the share flag 13*c* and save flag 13*d* to 0 (S302), and deletes the temporary files stored in the temporary file memory 13*a* (S303).

Next, the CPU 11 starts communication with the multifunction machine 400 via the wireless LAN connection I/F 25, and requests a scanned image from the multifunction machine 400 (S304). Meanwhile, the multifunction machine 400, on receiving the request from the mobile telephone 1, reads an original set in a predetermined position with a built-in scanner (not shown), generates a scanned image, and transmits the scanned image to the mobile telephone 1. The CPU 11 acquires the scanned image from the multifunction machine 400 (S305), and determines whether or not the scanned image acquisition is finished (S306). If it is determined in S306 that the scanned image acquisition is not finished (S306: No), the CPU 11 repeats the process from S305. On the scanned image acquisition finishing (S306: Yes) while repeating the process in this way, the CPU 11 stores the acquired scanned image in the temporary file memory 13*a* as a temporary file (S308).

Next, the CPU 11 displays the scanned image browsing screen (FIG. 2A) on the LCD 16, and displays any one of the scanned images stored in the temporary file memory 13*a* on the scanned image browsing screen (S310). Next, the CPU 11 determines whether or not a scanned image has been selected by the user. For example, the CPU 11 determines whether or not an operation of sliding a finger in a crosswise direction of the screen has been carried out on the touch panel 17 (S312). If it is determined in S312 that a sliding action has been carried out (S312: Yes), the CPU 11 switches the scanned image displayed on the LCD 16 for another scanned image selected based on the amount of sliding (S314). Meanwhile, if it is determined in S312 that no sliding action has been carried out (S312: No), the CPU 11 skips the process of S314. In the event that a single scanned image is stored in the temporary file memory 13*a*, no switching of the scanned image is carried out, even if it is determined in S312 that a sliding action has been carried out.

Next, the CPU 11 determines whether or not one of the "save command" and the "share output command" has been received (S316). If it is determined that no command has been received (S316: None), the CPU 11 repeats the process from S312. Meanwhile, if a "save command" has been received (S316: Save), the CPU 11 sets "1" for the save flag 13*d* (S318), and determines whether or not the share flag 13*c* is "1" (S320). That is, the CPU 11 determines whether or not the scanned image to be saved has already been share output to another application.

If the share flag 13*c* is not at "1" (S320: No), that is, if a "save command" has been input for a scanned image that has not yet been share output to another application, the CPU 11 generates a file name in accordance with a first rule (S322).

In the embodiment, the "first rule" is a rule that stipulates generating the file name by adding a number (a sequence number) sequential to that of another scanned image, and an extension, to a string of numbers indicating the current "year, month, day, hour, minute, and second". For example, the CPU 11 acquires the current time from a base station (not shown), adds a number (for example, 10) indicating a sequence number, and an extension (for example, .jpg), to a number (for example, 08) indicating the last two digits of the year, a number (for example, 0520) indicating the month and day, and a number (for example, 091255) indicating the time, minute, and second, all extracted from the current time, thereby generating a character string (for example, 08052009125510.jpg), and adopts the character string as the file name (S322).

Next, the CPU 11 attaches the generated file name to the scanned image stored in the temporary file memory 13*a*, and stores the scanned image in the file save memory 14*b* (S323). Specifically, the CPU 11 calls an API (application program interface) of the OS 12*a*, and instructs the API to execute a save of the scanned image. Then, the CPU 11 returns to S312, and repeats the process.

As described above, a file name including the year, month, day, hour, minute, and second, and a sequence number, is attached to the scanned image saved in the file save memory 14*b*. It may be possible to prevent other image files already stored in the file save memory 14*b* and the newly saved scanned image from having the same file name.

Also, when a plurality of scanned images are stored in the temporary file memory 13*a*, the file name attached to each scanned image in the process of S323 includes a sequence number sequential to that of another scanned image. Therefore, even when a plurality of scanned images are acquired from the multifunction machine 400, it is possible to attach a unique file name to each scanned image.

Also, when Android is installed as the OS 12*a*, the file name of the saved file is not displayed on the LCD 16 (although this is not the case when a special application for displaying the file name is installed in the mobile telephone 1). Consequently, even when attaching a file name with a large number of characters to data to be saved, there is little likelihood of causing annoyance for the user.

Next, a description will be given of a case in which a "share output" is selected. When a "share output command" is received (S316: Share output), the CPU 11 sets "1" for the share flag 13*c* (S328). Although omitted from the flowchart, when a "share output command" is received, the OS 12*a* displays the output destination selection screen shown in FIG. 2B on the LCD 16, allowing the user to select a share output destination application.

Next, the CPU 11 acquires the current time from a base station (not shown), and stores the "year, month, day, hour, and minute" included in the current time in the share time memory 13*b* as a share time (S330). Next, the CPU 11 determines whether or not the save flag 13*d* is "1". That is, the CPU 11 determines whether or not the scanned image to be share output has already been saved in the file save memory 14*b* (S332).

If the save flag 13*d* is not "1" (S332: No), that is, if it is determined that a "share output command" has been received for a scanned image that has not yet been saved in the file save memory 14*b*, the CPU 11 generates a file name in accordance with a second rule. In the embodiment, the second rule is a rule that stipulates adding an extension to a string of numbers indicating the current "year, month, and day", and furthermore, stipulates adding a sequential number (a sequence number) when a plurality of scanned images are to be share output.

Specifically, the CPU 11 determines whether or not a plurality of scanned images are stored in the temporary file memory 13*a* (S334). Then, if it is determined that there is a single scanned image (S334: No), the CPU 11 adds an extension to a number (for example, 08) indicating the last two digits of the year and a number (for example, 0520) indicating the month and day, extracted from the current time, thereby generating a character string (for example, 080520.jpg), and adopts the character string as the file name (S336).

Meanwhile, if it is determined that there are a plurality of scanned images (S334: Yes), the CPU 11 generates a character string (for example, 08052010.jpg) wherein a number (for example, 10) indicating a sequence number and an extension are added to a number (for example, 08) indicating the last two digits of the year and a number (for example, 0520) indicating the month and day, and adopts the character string as the file name (S338). That is, when a plurality of scanned images exist, a file name including a sequence number sequential to that of another of the plurality of scanned images is attached.

Next, the CPU 11 attaches the generated file name to the scanned image stored in the temporary file memory 13*a*, and share outputs the scanned image to the application selected by the user (S337). Specifically, the CPU 11 calls an API of the OS 12*a*, and causes it to execute a share output of the scanned image to another application. Although omitted from the flowchart of FIGS. 3A and 3B, the application that receives the scanned image from the OS 12*a* displays an operation screen (for example, the operation screen shown in FIG. 2C) on the LCD 16, and accepts a command relating to the application from the user. Then, on the user executing a predetermined process, such as a transmission of an electronic mail, and finishing the application, the CPU 11, after reverting the display on the LCD 16 to the scanned image browsing screen (FIG. 2A), returns to S312, and repeats the process.

As heretofore described, a file name including up to "hour, minute, and second" is attached to a scanned image to be saved, in accordance with the first rule. As opposed to this, a file name that does not include "hour, minute, and second" is attached to a scanned image to be share output to another application, in accordance with the second rule. That is, it is possible to attach a shorter file name when a scanned image is share output to another application than when a scanned image is saved. This is because there is less need to attach a unique file name to a scanned image that is share output to another application than to a scanned image that is saved in the file save memory 14*b*.

Also, as shown in FIG. 2C, it may happen that the file name of a scanned image that is share output to another application is displayed on the screen as, for example, the name of a file attached to an electronic mail. Therefore, by making the file name of a scanned image that is share output to another application a short one, the user is unlikely to feel annoyed even when the file name is displayed on the LCD 16.

Herein, there is a case in which the user, after share outputting a scanned image to another application, would like to save the same scanned image. That is, it is a case in which a "save command" is received (S316: Save), and "1" is set for the share flag 13*c* (S320: Yes). In this case, the CPU 11 retrieves the share time stored in the share time memory 13*b*, and generates a folder with the share time as a folder name in the file save memory 14*b* (S324). Then, the CPU 11 saves the scanned image in the generated folder (S326). Next, the CPU 11 returns to S312, and repeats the process.

When saving a scanned image that has once been share output in the folder, the CPU 11 attaches a file name generated in accordance with the second rule in place of a file name generated in accordance with the first rule. That is, the CPU 11 attaches to the data to be saved a file name the same as the file name attached to the scanned image already share output. For example, when attaching the file name "080520.jpg" when share outputting the scanned image, the scanned image is saved with the same file name attached. Also, when share outputting a plurality of scanned images with a file name including a sequence number (for example, "080520.jpg") attached, each of the plurality of scanned images is saved with the same file name attached as when share outputting when saving the plurality of scanned images.

As heretofore described, as a file name generated in accordance with the second rule has a short character string, there is a danger that identical file names exist. However, according to the scanning process of the embodiment, as a folder with a folder name based on the share time is generated, and the scanned image is saved in the folder, it is possible to differentiate by folder and save each scanned image, even when identical file names exist.

It is sufficient that the "share time" that is to be included in the folder name includes at least the year, month, day, hour, and minute. It may be possible to prevent folder names from being duplicated even when folders with the share time as the folder name are generated a plurality of times in one day.

Next, a description will be given of a case in which the user, after a scanned image has been saved, would like to share output the scanned image to another application too. That is, it is a case in which it is determined that a "share output command" is received (S316: Share output), and "1" is set for the save flag 13*d* (S322: Yes). In this case, the CPU 11 attaches a file name the same as that of the saved scanned image, and share outputs the scanned image to another application (S340). That is, the CPU 11 attaches a file name generated in accordance with the first rule, in place of a file name generated in accordance with the second rule, to the scanned image to be share output. Next, the CPU 11, after reverting the display on the LCD 16 to the scanned image browsing screen (FIG. 2A), returns to S312, and repeats the process.

According to the scan application 14a of the first embodiment, a file name generated in accordance with the first rule is attached to a scanned image that is to be saved. Meanwhile, a file name generated in accordance with the second rule, which differs from the first rule, is attached to data that are to be share output to another application. Therefore, it is possible to attach a data name in accordance with an intended use of the data.

Also, as the same file name is attached to the scanned image to be saved and the scanned image to be share output when a save and share output are executed for the same scanned image, the relationship between the saved scanned image and share output scanned image is easily understood, even subsequently.

A description will be given of a second embodiment, referring to FIGS. 4A and 4B. The mobile telephone 1 of the second embodiment may has the same electrical configuration as the mobile telephone 1 in the first embodiment, except for the point that the share flag 13c and save flag 13d are not applied. Also, a scanning process executed by the CPU 11 of the second embodiment may differ partially from the scanning process of the first embodiment. Hereafter, portions the same as in the first embodiment will be given the same reference numerals and characters, and a description will be omitted, while a description will be given of points differing from the first embodiment.

FIG. 4 is a flowchart showing a scanning process executed by the CPU 11 of the mobile telephone 1 of the second embodiment. The scanning process of the second embodiment is the same as that of the first embodiment in that a scanned image is share output to another application when a "share output command" is received, but differs from the scanning process of the first embodiment in that, furthermore, a duplicate (copy) of the scanned image to be share output is saved in the file save memory 14b.

Also, as the share flag 13c and save flag 13d are not applied in the mobile telephone 1 of the second embodiment, the processes of S318, S320, S324 to S332, and S340, of the processes included in the scanning process of the first embodiment, are omitted from the scanning process of the second embodiment.

Figure 4A:
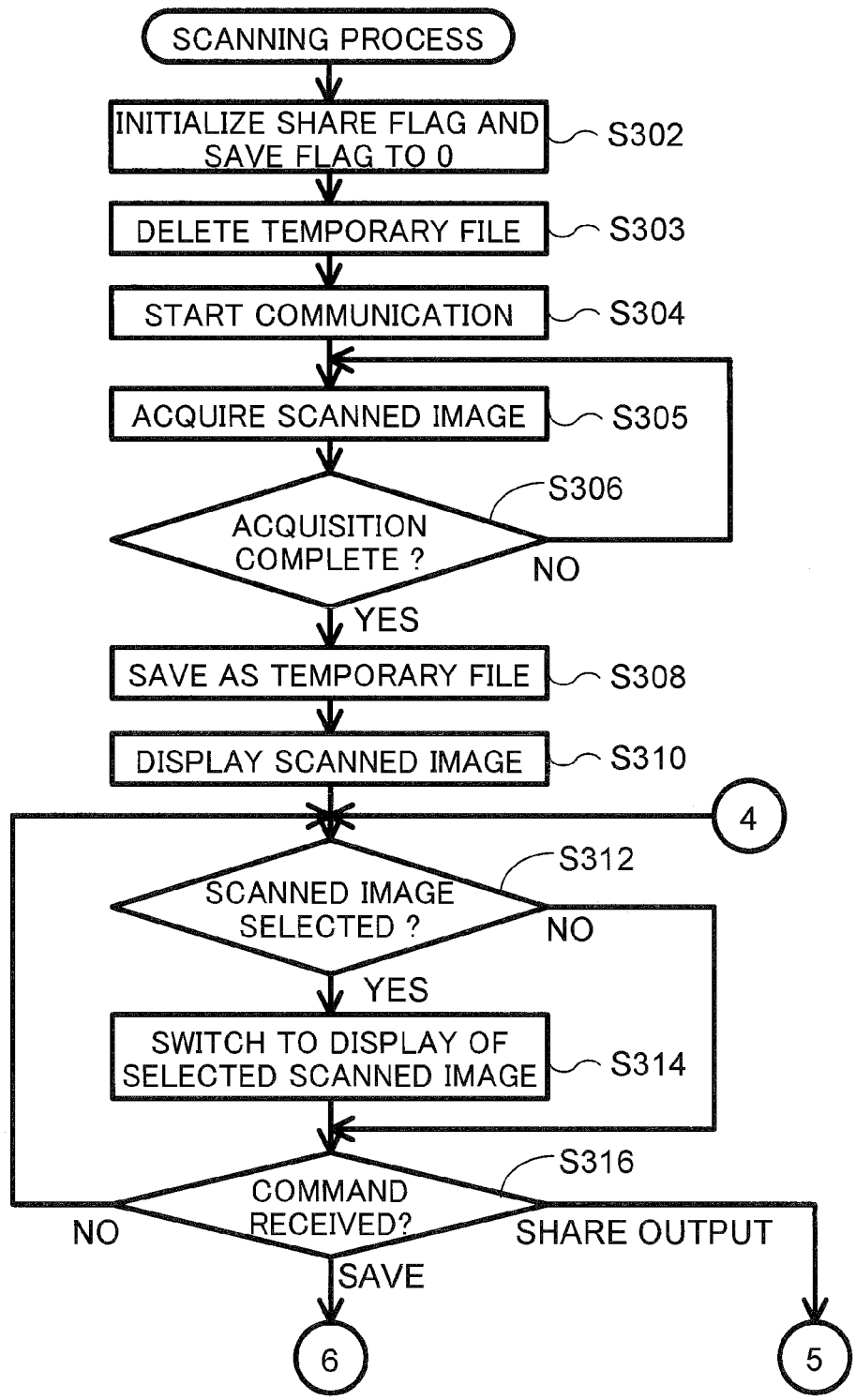
FIGS. 4A and 4B show a flowchart of a scanning process executed in a second embodiment of a mobile telephone.
Figure 4B:
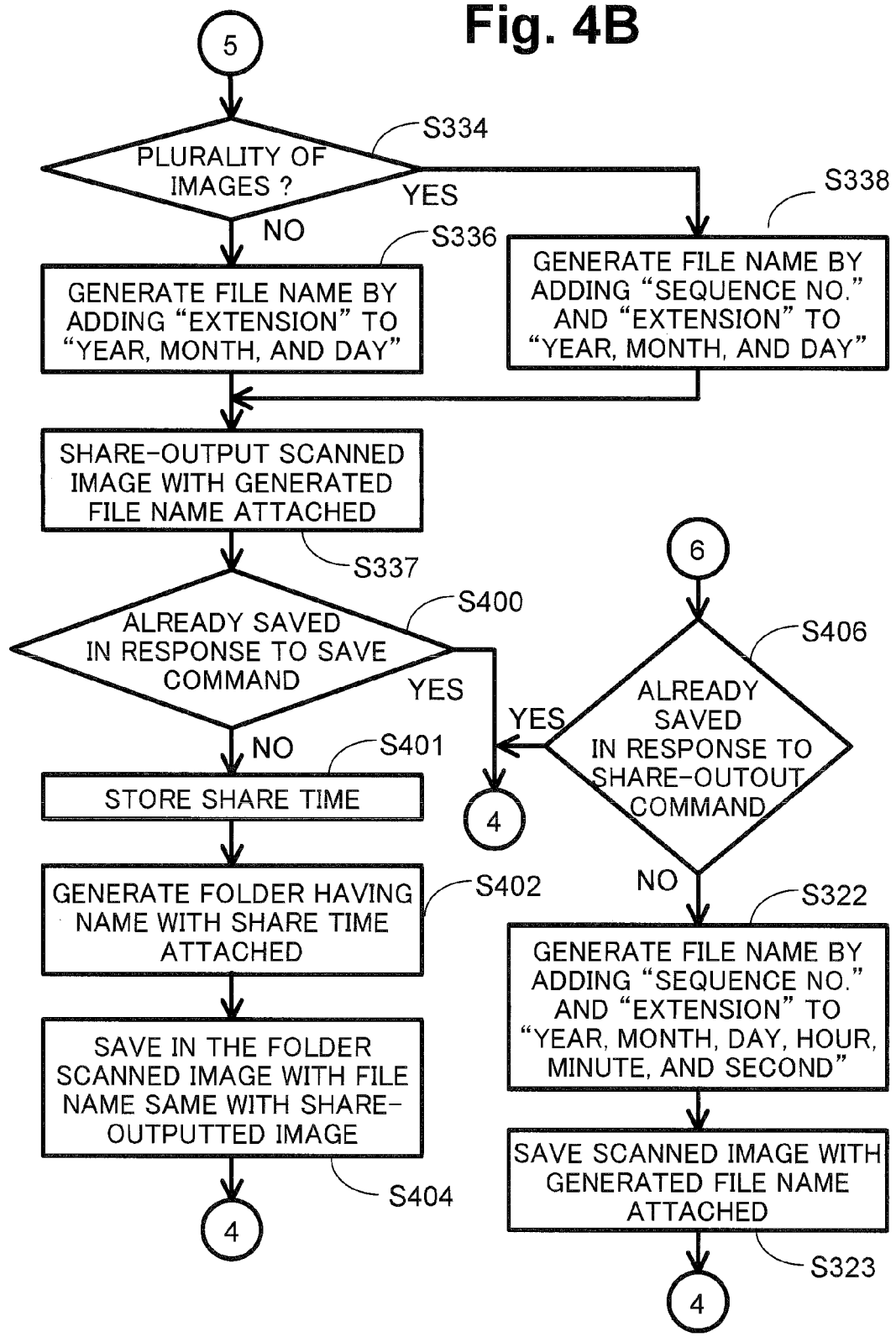

As shown in FIGS. 4A and 4B, when a "share output command" is received (S316: Share output), the CPU 11 determines whether or not a plurality of scanned images are stored in the temporary file memory 13a (S334) and, if it is determined that there is a single scanned image (S334: No), the CPU 11, in the same way as in the first embodiment, generates a character string, wherein an extension is added to a number indicating the last two digits of the year and a number indicating the month and day, as a file name (S336). Meanwhile, if it is determined that there are a plurality of scanned images (S334: Yes), the CPU 11, in the same way as in the first embodiment, generates a character string including a number indicating the last two digits of the year, a number indicating the month and day, a number indicating a sequence number sequential to that of another scanned image, and an extension, as a file name (S338).

Next, the CPU 11 attaches the generated file name to the scanned image stored in the temporary file memory 13a, and share outputs the scanned image to the application selected by the user (S337). Next, the CPU 11 determines whether or not the share output scanned image has already been saved in the file save memory 14b (S400). That is, the CPU 11 determines whether or not a "save command" has been received, and the scanned image saved, prior to the "share output command" being received. If it is determined in S400 that the scanned image has been saved (S400: Yes), the CPU 11 returns to S312, and repeats the process.

Meanwhile, if it is determined in S400 that the scanned image has not been saved (S400: No), the CPU 11 acquires the "year, month, day, hour, and minute" included in the current time as a share time, and stores it in the share time memory 13b (S401). Next, the CPU 11 generates a folder with the share time as a folder name in the file save memory 14b (S402). Then, the CPU 11 generates a duplicate of the share output scanned image, and saves it in the folder generated in S402 (S404). Specifically, the CPU 11 calls an API of the OS 12a, and causes it to execute a save of the scanned image stored in the temporary file memory 13 (that is, the scanned image identical to the share output scanned image).

The CPU 11 attaches a file name the same as the file name attached to the share output scanned image to the duplicate of the scanned image (S404). For example, in the case of attaching the file name "080520.jpg" when share outputting the scanned image, the same file name is attached to the duplicate of the scanned image. Also, when share outputting a plurality of scanned images with a file name including a sequence number (for example, "080520.jpg") attached, the same file name as when share outputting is attached to the duplicate of each of the plurality of scanned images.

Meanwhile, if a "save command" has been received (S316: Save), the CPU 11 determines whether or not the scanned image has already been saved in the file save memory 14b (S406). As heretofore described, according to the second embodiment, a save of the scanned image is executed even if a "share output command" has been received. Therefore, in S406, the CPU 11 determines whether or not a save of the scanned image based on a "share output command" has already been executed.

If it is determined in S406 that the scanned image has been saved (S406: Yes), the CPU 11 returns to S312, and repeats the process. That is, the CPU 11 does not execute a save of the scanned image. Meanwhile, if it is determined in S406 that the scanned image has not been saved (S406: No), the CPU 11, in the same way as in the first embodiment, attaches a file name based on the first rule (S322), and saves the scanned image with the generated file name attached (S323).

According to the mobile telephone 1 of the second embodiment, as a duplicate of a share output scanned image is automatically saved, there is a high degree of convenience for the user. Also, as the same file name is attached to the saved duplicate as to the share output scanned image, the relationship between the saved duplicate and share output scanned image is easily understood, even subsequently. Also, as a file name generated in accordance with the second rule has a short character string, there is a danger that the file name is the same as another file name. However, according to the scanning process of the second embodiment, as a folder with a folder name based on the share time is generated, and the duplicate of the scanned image is saved in the folder, it is possible to differentiate by folder and save the duplicate of the scanned image, even when identical file names exist.

In the heretofore described embodiments, the mobile telephone 1 corresponds to an example of a computer and data management device. The scan application 14a corresponds to an example of a data management application. The electronic mail application 14c corresponds to an example of another application. A scanned image corresponds to an example of data. A file name corresponds to an example of a data name. A sequence number corresponds to an example of a value sequential to that of another of a plurality of items of data. The CPU 11 that executes S305 corresponds to an example of an acquisition unit. The CPU 11 that executes S314 corresponds to an example of a selection unit and display unit. The CPU 11 that executes S320 corresponds to an example of an output determination unit. The CPU 11 that executes S323 and S326 corresponds to an example of a first naming unit and first processing unit. The CPU 11 that executes S332 corresponds to an example of a save determination unit. The CPU 11 that executes S334 corresponds to an example of a data determination unit. The CPU 11 that executes S337 and S340 corresponds to an example of a second naming unit and second processing unit. The CPU 11 that executes S404 corresponds to an example of a duplicate save unit and third naming unit.

Heretofore, a description has been given of the invention based on the embodiments but, the invention being in no way limited to the embodiments, it can be easily imagined that various improvements and changes are possible without departing from the scope of the invention.

For example, in the embodiments, when a save command is received, a sequence number is added to the file name, regardless of whether there is a single scanned image or a plurality thereof. However, a configuration may also be such that no sequence number is added to the data name when there is one item of data to be saved.

Also, in the embodiments, a description has been given with a case of saving or share outputting a JPEG format scanned image acquired from the multifunction machine 400 as an example, but the invention is also applicable when, for example, saving or share outputting data received using an electronic mail function of the mobile telephone 1. Also, the invention is also applicable when saving or share outputting data that have not been filed (for example, an object moved to a memory). Also, the invention is also applicable when saving or share outputting data generated by the mobile telephone 1 (for example, photographic data recorded by a camera function of the mobile telephone 1). Furthermore, the invention is also applicable when saving or share outputting various kinds of data other than an image (for example, text data or table data).

Also, in the embodiments, a file name is one example of a data name, but the invention is also applicable when, for example, attaching a data name to data that have not been filed.

Also, in the embodiments, a description has been given assuming that either a save command or share output command can be received. However, when configuring in such a way that a command other than a save command or share output command (for example, an edit command) can be received, the configuration may be such that a data name generated in accordance with the second rule is attached to data processed based on the other command.

Also, in the scanning processes of the embodiments, file names are attached to all the scanned images stored in the temporary file memory 13*a*, and a save or share output is executed. However, in place of this, a scanning process may be configured in such a way that a file name is attached only to currently displayed data selected by the user, and the data saved or share output. In other words, a configuration may be such that no file name is attached to data other than currently displayed data, and no save or share output is executed. It may be possible to attach a data name after allowing the user to visually confirm the data to which the data name is to be attached.

Also, in the embodiments, a share output command is an example of a data processing command but, for example, a command causing data to be output to the external device 102, or a command causing data to be uploaded to a server, may also be an example of a data processing command. In this case, the external device 102 or server corresponds to an example of another device.

Also, in the embodiments, a description has been given with the mobile telephone 1 as an example of a computer, but various kinds of device, such as an electronic game machine, a digital camera, a multifunction machine, or a personal computer, may also be an example of a computer. Also, Android is installed as the OS 12*a* in the mobile telephone 1 of the embodiments, but the invention is also applicable to an instrument in which an OS other than Android is installed.

Also, the first rule and second rule of the embodiments can each be changed as appropriate. For example, the second rule may be a rule that stipulates generating a data name of eight characters or less. It may be possible to prevent a situation arising wherein the number of characters in the data name exceeds the limit of a data output destination system.

Also, the first embodiment and second embodiment can be combined as appropriate. For example, a configuration may be such that when a "share output command" is selected by the user (S326: Share output) in the scanning process of the first embodiment (FIG. 3), the user is allowed to select whether to execute a "save and share output" or to "share output without executing a save" and, when a "save and share output" is selected, the processes of S334 to S338 and S400 to S404 of the scanning process of the second embodiment are executed.

What is claimed is:

1. A data management device, comprising:
   a memory configured to save data;
   a command receiving unit configured to receive a save command and a particular command different from the save command;
   an acquisition unit configured to acquire data;
   a processor configured to:
   save the data acquired by the acquisition unit into the memory when the save command is received by the command receiving unit;
   execute a process which processes the data acquired by the acquisition unit when the particular command is received by the command receiving unit, the process being different from saving the data into the memory;
   generate a first data name in accordance with a first rule and attach the first data name to the acquired data to be saved in the memory; and
   generate a second data name in accordance with a second rule different from the first rule and attach the second data name to the acquired data to which the process is to be executed.

2. The data management device according to claim 1, wherein, the processor is further configured to output the data, to which the second data name is attached, to an external unit.

3. The data management device according to claim 1, the processor is further configured to:
   when the particular command is received by the command receiving unit, determine whether the data have already been saved in the memory or not;
   if it is determined that the data have already been saved in the memory, attach a data name the same as the data name of the stored data, in place of a data name in accordance with the second rule, to the data and execute the process corresponding to the specific command; and
   if it is determined that the data have not been saved in the memory, generate the second data name in accordance with a second rule different from the first rule and attach the second data name to the acquired data to which the process is to be executed.

4. The data management device according to claim 1, the processor is further configured to:
when the save command is received by the command receiving unit, determine whether the process corresponding to the particular command has already been executed or not;
if it is determined that the process corresponding to the particular command have already been executed to the data, attach a data name the same as the data name attached to the data to which the process is executed, in place of a data name generated in accordance with the first rule; and
if it is determined that the process corresponding to the particular command have not already been executed to the data, attach a data name generated in accordance with the first rule to the data to be saved.

5. The data management device according to claim 2, the processor is further configured to:
save a duplicate of data outputted; and
attach a data name the same as the data name of the outputted data.

6. The data management device according to claim 1, the processor is further configured to:
select one item of data acquired by the acquisition unit;
display the selected data; and
attach the data name to data currently displayed.

7. The data management device according to claim 1, the processor is further configured to:
determine whether a plurality of items of data have been acquired; and
when it is determined that a plurality of items of data have been acquired, generate the data name such that the data name includes a value sequential to that of another of the plurality of items of data.

8. A non-transitory computer-readable medium bearing instructions for controlling a data management device including a memory configured to save data and a command receiving unit configured to receive a save command and a particular command different from the save command, the instructions, when executed, being arranged to cause a processor to perform the steps of:
acquiring data;
saving the acquired data in the memory when the save command is received by the command receiving unit;
executing a process which processes the acquired data when the particular command is received by the command receiving unit, the process being different from saving the data into the memory;
generating a first data name in accordance with a first rule and attaching the first data name to the acquired data to be saved in the memory; and
generating a second data name in accordance with a second rule different from the first rule and attaching the second data name to the acquired data to which the process is to be executed.

9. The non-transitory computer-readable medium according to claim 8, wherein the instructions, when executed, being further arranged to cause the processor to perform a step of outputting the data to which the second data name is attached.

10. The non-transitory computer-readable medium according to claim 8, wherein the instructions, when executed, being further arranged to cause the processor to perform steps of:
when the particular command is received by the command receiving unit, determining whether the data have already been saved in the memory or not;
if it is determined that the data have already been saved in the memory, attaching a data name the same as the data name of the stored data, in place of a data name in accordance with the second rule, to the data and executing the process corresponding to the particular command; and
if it is determined that the data have not been saved in the memory, generating the second data name in accordance with a second rule different from the first rule and attaching the second data name to the acquired data to which the process is to be executed.

11. The non-transitory computer-readable medium according to claim 8, wherein the instructions, when executed, being further arranged to cause the processor to perform steps of:
when the save command is received by the command receiving unit, determining whether the process corresponding to the particular command has already been executed or not;
if it is determined that the process corresponding to the particular command have already been executed to the data, attaching a data name the same as the data name attached to the data to which the process is executed, in place of a data name generated in accordance with the first rule; and
if it is determined that the process corresponding to the particular command have not already been executed to the data, attaching a data name generated in accordance with the first rule to the data to be saved.

12. The non-transitory computer-readable medium according to claim 9, wherein the instructions, when executed, being further arranged to cause the processor to perform steps of:
saving a duplicate of the outputted data; and
attaching a data name the same as the data name of the outputted data.

13. The non-transitory computer-readable medium according to claim 8, wherein the instructions, when executed, being further arranged to cause the processor to perform steps of:
selecting one item of the acquired data;
displaying the selected data; and
attaching the data name to data currently displayed.

14. The non-transitory computer-readable medium according to claim 9, wherein the instructions, when executed, being further arranged to cause the processor to perform steps of:
determining whether a plurality of items of the data have been acquired; and
when it is determined that a plurality of items of the data have been acquired, generating the data name such that the data name includes a value sequential to that of another of the plurality of items of data.

15. A data management method for a data management device including a memory configured to save data, a command receiving unit configured to receive a save command and a particular command different from the save command, the method comprising steps of:
acquiring data;
receiving a save command and a particular command different from the save command;
saving the data acquired in the acquiring step into the memory when the save command is received in the receiving step;
executing a process which processes the data acquired in the acquiring step when the particular command is received in the receiving step, the process being different from saving the data into the memory;

generating a first data name in accordance with a first rule and attaching the first data name to the acquired data to be saved in the memory; and generating a second data name in accordance with a second rule different from the first rule and attaching the second data name to the acquired data to which the process is to be executed.

* * * * *